No. 710,517. Patented Oct. 7, 1902.
G. ROWBOTTOM.
MACHINE FOR SEWING HOOKS AND EYES ON CARDS.
(Application filed May 1, 1901.)
(No Model.) 9 Sheets—Sheet 4.

Witnesses. Inventor.
George Rowbottom

No. 710,517. Patented Oct. 7, 1902.
G. ROWBOTTOM.
MACHINE FOR SEWING HOOKS AND EYES ON CARDS.
(Application filed May 1, 1901.)
(No Model.) 9 Sheets—Sheet 6.

Witnesses.
Wm. A. Courtland
O. F. Sounek.

Inventor.
George Rowbottom
by Knight Bros
Attys.

THE NORRIS PETERS CO., PHOTO-LITHO., WASHINGTON, D. C.

No. 710,517. Patented Oct. 7, 1902.
G. ROWBOTTOM.
MACHINE FOR SEWING HOOKS AND EYES ON CARDS.
(Application filed May 1, 1901.)
(No Model.) 9 Sheets—Sheet 8.

Witnesses,
Wm. A. Courtland
P. F. Smeck.

Inventor.
George Rowbottom
by Knight Bros
Attys.

No. 710,517.  
Patented Oct. 7, 1902.  
G. ROWBOTTOM.  
MACHINE FOR SEWING HOOKS AND EYES ON CARDS.  
(Application filed May 1, 1901.)  
(No Model.)  
9 Sheets—Sheet 9.

UNITED STATES PATENT OFFICE.

GEORGE ROWBOTTOM, OF WATERBURY, CONNECTICUT, ASSIGNOR TO AMERICAN PIN COMPANY, OF WATERBURY, CONNECTICUT, A CORPORATION OF CONNECTICUT.

MACHINE FOR SEWING HOOKS AND EYES ON CARDS.

SPECIFICATION forming part of Letters Patent No. 710,517, dated October 7, 1902.

Application filed May 1, 1901. Serial No. 58,289. (No model.)

*To all whom it may concern:*

Be it known that I, GEORGE ROWBOTTOM, a citizen of the United States, residing at Waterbury, in the county of New Haven and State of Connecticut, have invented certain new and useful Improvements in Article-Feeding Means for Machines for Fastening Hooks and Eyes on Cards, of which the following is a specification.

This invention relates to improvements in article-feeding means for machines for fastening hooks and eyes on cards, and it relates specifically to improvements in Letters Patent No. 674,268, issued to F. M. Johnson May 14, 1901.

The object of the present improvements is to render more effectual the devices for feeding the hooks and eyes in proper relative position to the cards and to simplify and improve the hook-and-eye engaging and delivery means and other parts of the machine, as hereinafter set forth.

Referring to the accompanying drawings, Fig. 4ª is a detail view of the device for actuating the looper-hooks of the sewing mechanism.

As in the patent above referred to, the present machine comprises the following essential elements: separate receptacles for holding, respectively, hooks and eyes in bulk, feeding devices for feeding the hooks in regular order to a position adjacent to the card, feeding devices for feeding the eyes in regular order to a position adjacent to the card, gripper mechanism adapted to move the hooks and eyes into engaged relation and to place same in proper position relatively to the card, presser-foot means for holding the hooks and eyes in such position, and sewing mechanism to sew the hooks and eyes on the card while held in such position.

In order to show a complete operative machine, I have herein shown certain features, such as the sewing mechanism and card-feeding mechanism, which are not herein specifically claimed, as they form the subject of my divisional applications, Serial Nos. 78,161 and 78,162, filed October 10, 1901.

The machine is made to work in duplicate—that is, to simultaneously attach the pairs of hooks and eyes in two rows on the cards—and the machine itself is therefore also duplicate, each operative part being in general duplicated on the two sides of the machine. All the parts are supported on a suitable bed, table, or frame 1, which is provided with a central bracket 2 for the needle-bar mechanism, on a standard 3, which supports also the eye-feeding mechanism, and standards 4 4, supporting the hook-feeding mechanism. In the center of the bed 1 is arranged a table 9, on which the cards are fed as the sewing is effected.

The main driving-shaft 5, carrying the driving-pulley 6, with clutch 7, is connected by miter-gears 8 to a shaft 10 and by miter-gears 11 to a shaft 12, these shafts 10 and 12 being parallel and extending from the back to the front of the machine, and all of the above-named shafts being journaled in suitable bearings in the machine-frame.

Figure 1:
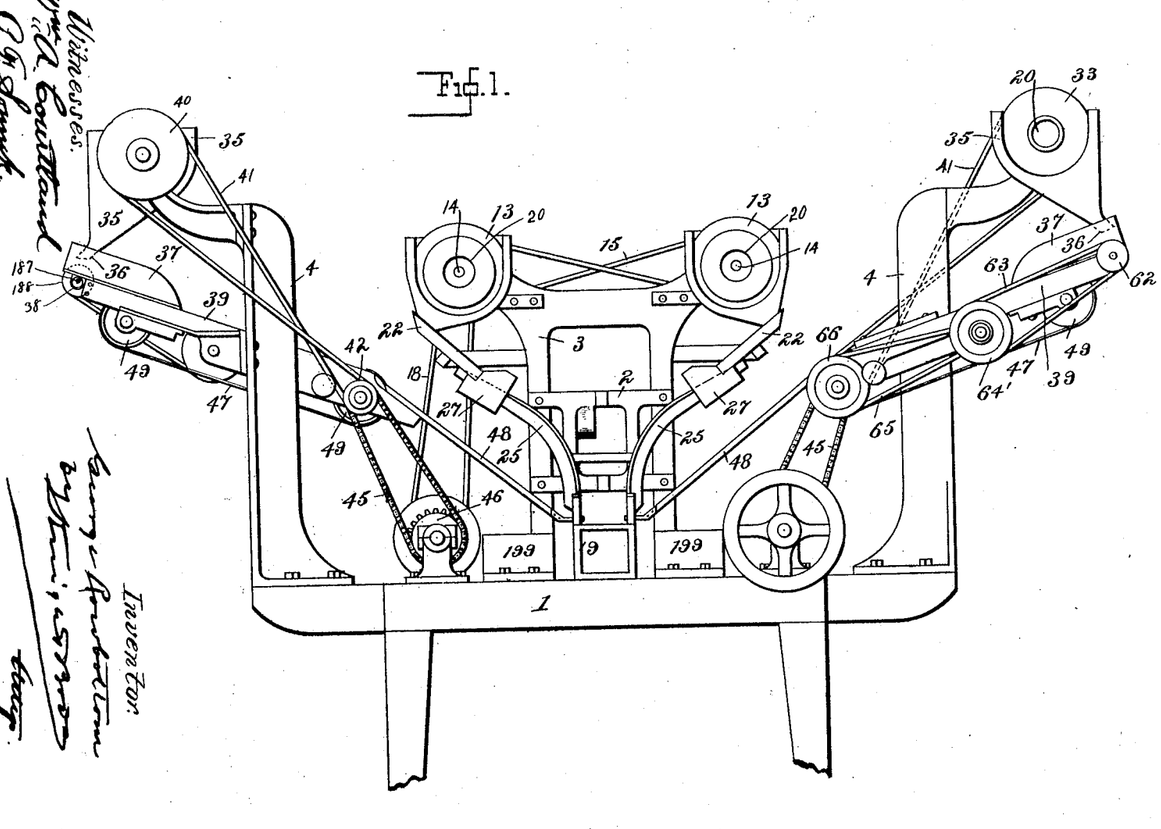
Figure 1 is a front elevation of a machine embodying my invention, showing the general arrangement of the parts, but with minor details omitted.
Figure 2:
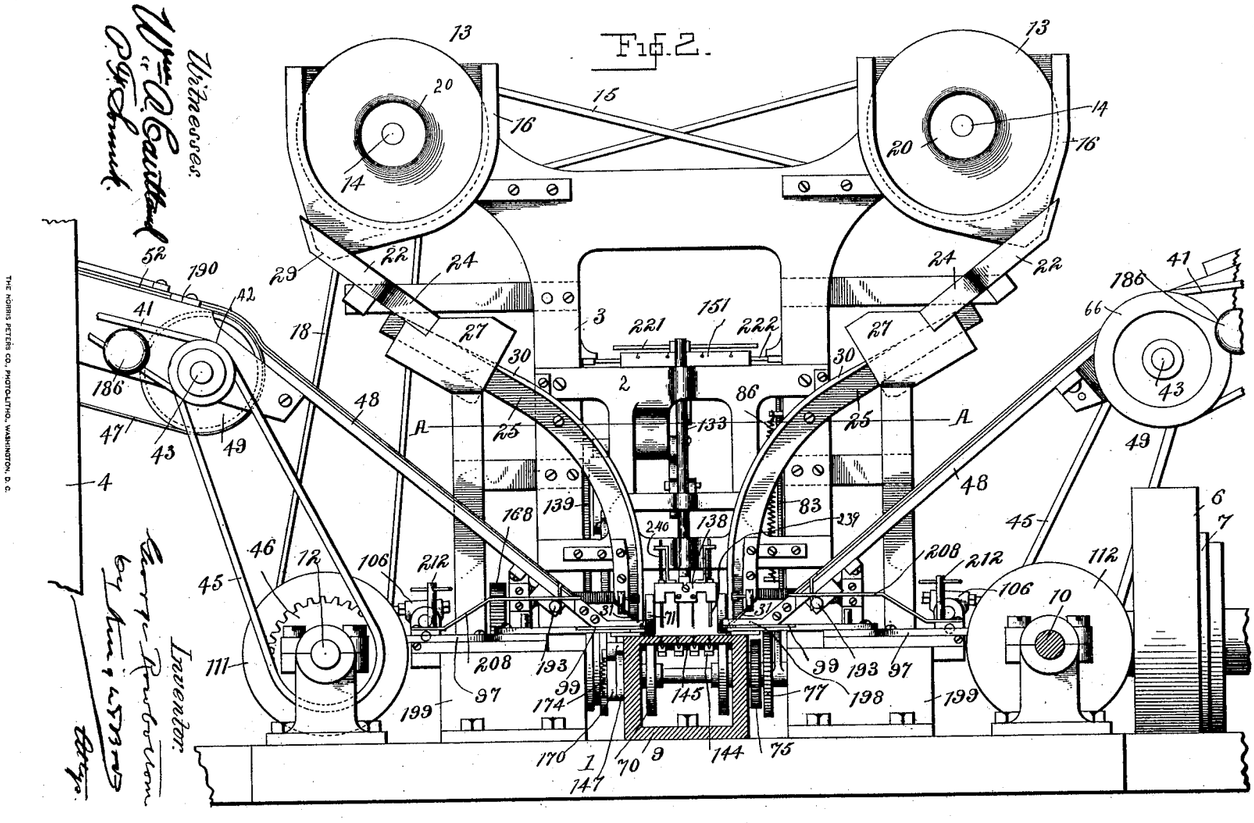
Fig. 2 is a front elevation of the central portion of the machine, showing the parts more in detail.
Figure 12:
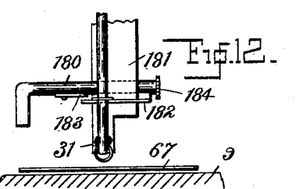
Fig. 12 is a rear view of the lower end of the eye-chute.

Each of the eye-feeding means comprises a drum or receptacle 13, carried by a shaft 14, mounted to rotate in a bearing on top of standard 3. The eye-receptacle 13 is open at the end, as shown at 20, to permit of its being charged with eyes, and it flares or expands conically toward the other end, where it is provided with holes 21 near its outer edge, through which the eyes are dropped or shaken out slowly a few at a time in the rotation of the drum, the conical shape of the drum insuring a gradual movement of the eyes toward this end. The slow rotative movement necessary to effect this gradual discharge of the eyes is effected for the drum on one side of the machine by a belt 18, connecting a pulley 17 on a shaft 14 of the eye-receptacle with a pulley 19 on the secondary driving-shaft 12. The drum on the other side is driven by a belt 15 from the shaft of the first-named drum in obvious manner. A casing 16 is fixed to the standard 3 and surrounds or embraces the drum or receptacle 13 in such manner that all the eyes discharged from the latter are received in said casing and pass down the inclined bottom of same to a discharge-opening 29. Arranged with its upper end below and surrounding this opening is a chute 22, which extends obliquely downward and has a contracted portion or throat 24, below which it expands again, as shown, its lower end leading to a spillway or wasteway 27. A rail or eye-race 25 extends from a point in the bottom of the chute 22 within the contracted throat 24 and descends at a lesser angle than the chute, so that the chute falls away from it, this rail then extending through the end wall of the chute with sufficient free room to permit passage of eyes on the rail and then dropping down to a point near the table 9 and near the position in which the cards are placed. The eyes as they pass down the chute 22 are directed by the contracted throat 24 of the latter so as to pass onto the rail 25, the eye then straddling the rail and riding down on same by gravity. Such of the eyes as may not so engage with the rail fall through the spillway 27 and are collected by suitable means. Beginning at a point somewhat below the upper end of each rail 25 and on the upper edge of the rail is a bead 30, that tapers to a point at its upper end, so as to enable the bow or loop of the eye to slip over it and engage with the bead in such manner as to prevent the eye falling from the rail, while permitting free downward movement of the eye. The eyes are thus caused to pass downward in definite position with regard to the rail. At some part of the rail, preferably near its lower end, I provide an escapement mechanism that temporarily arrests the downward movement of the eyes and permits same to pass only one at a time, or singly, to the lower end of the rail. This escapement mechanism comprises a slide 180, that extends transversely through a fixed frame-block 181, attached to the frame or standard 3, and said slide 180 carries two fingers 182 183, (see Figs. 2 and 12,) that extend from opposite sides toward or into a slot in the rail 25, directly back of the bead 30. Said slide is moved in one direction by a cam mechanism hereinafter described and is returned by a spring 184. As the slide 180 is moved to and fro these fingers alternately come into position to engage the eyes on the rail, it being understood that the sewing-eyes of the eye extend back of the bead 30 in position to engage said fingers. One of these fingers is offset a little from the other, said fingers being, in fact, out of line with one another in the direction of the length of the rail about the thickness of an eye, so that when the upper finger is withdrawn the eye that was resting thereon falls onto the lower finger and is then below the line of action of the upper finger. Then when the lower finger passes from engaging position it will allow this eye resting thereon to drop and continue its passage down the rail and then on the return movement will again catch another eye dropped by the upper finger, and so on. The upper finger is beveled, as shown, to facilitate its passage beneath the eyes above it. The eyes, released from this escapement mechanism, pass on down the rail, and when they reach the lower end of the rail they are arrested by a leaf-spring 31, whose end normally bears against the tip of the rail, as shown in Figs. 2 and 12. The rail-tip and the spring aforesaid are so inclined and formed that when the eye falls down to the bottom of the rail and is caught by the spring—that is, between the spring and the rail-tip—it assumes an inclined position, with the loop of the eye presented downwardly at an angle, this effect being due to the spring 31 coming in contact with the sewing-eye ends of the eyes and retarding same, thus tipping the eyes, as stated.

The hook-receptacles 33 are identical in construction with the eye-receptacles 13, having openings 20 and 21 and being carried on shafts 34, journaled on the top of standards 4. A casing 35 partly surrounds each hook-receptacle and tapers at the bottom to a discharge-opening at 36 directly over the upper end of a vibrating tray 37, movably mounted on a bracket or plate 39, attached to standard 4. An apron 47 passes around rollers 49, journaled in bracket 39, said apron extending under the tray 37 and acting as a conveyer to carry the hooks from said tray to the top of the hook-chute 48, which extends from the lower end of said apron obliquely downward to a position in line with the lower end of the corresponding eye-chute. Rotation of each hook-drum is effected by a pulley 40 on the drum-shaft connected by belt 41 with pulley 42 on a shaft 43, journaled on bracket 39 and carrying the lower roller 49 for apron 47. A sprocket-wheel 44, loose on said shaft 43, is connected by chain 45 to sprocket-wheel 46 on the secondary driving-shaft 10 or 12, and a clutch 185, controlled by a handle 186, connects this loose wheel 44 with the shaft 43, so as to drive the latter. It being understood that the hooks will be discharged from the casing in various positions, whereas it is necessary that they should enter the hook-chute in definite invariable positions or directions, it is necessary to provide, first, means for causing all the hooks to be flat or "on their backs," and, second, to direct all such hooks so that they will enter the chute with the tip of the hook pointing downward. To effect the first result, I provide the vibrating tray or agitator 37, whose upper end is supported by an eccentric 38 on a shaft 187, journaled in bracket 39, this eccentric working in a strap or ring 188, secured to the tray 37. The lower end of tray 37 rests loosely on the bracket 39, and as the shaft 187 rotates the tray is given an undulating vibratory movement having both horizontal and vertical components. The vertical component of the motion tends to momentarily separate the hooks from the surface of the tray, and the horizontal component, particularly in connection with the pins or projections 189, serves to throw the pins endwise and tends to turn some of them over. A hook which is "flat on its back" is in such a position of stability that it is not liable to be overthrown by this operation; but any hook that is lying with its tongue or point downward is readily overthrown and set on its back by this means. The gradual feed of the hooks to the tray by the revolving receptacle is also essential to this operation, as the hooks must be somewhat scattered or distributed along the tray, so as to lie in open order. It is also essential that the tray should during its vibration be maintained in inclined position, so as to tend to feed the hooks continually in one direction, so as to maintain the hooks in open order. Moreover, the bottom of the tray should be flat—that is to say, it should be free from such ridges, elevations, depressions, or perforations as would interfere with the hooks resting and traveling on said tray while lying on their backs. The pins or projections 189, extending from the bottom of said tray, must be sufficiently far apart so as to enable the hooks to pass between them while lying flat on their backs on the flat bottom of the tray. The rotation of shaft 187 is effected by a pulley 62, connected by belt 63 with a pulley 64, rotating with a pulley 64', connected by belt 65 with a pulley 66 on the shaft 43, above referred to. As before stated, the pins or projections 189 project from the bottom of the tray, and in such movement of the tray the hooks are engaged by these pins and such of them as are lying hook downward are overturned and caused to lie hook upward, this being the most stable position. The pins or projections are arranged quincuncially, so that the hooks cannot pass directly from one end of the tray to the other, but meander along until they pass down eyes first. From this tray the hooks fall onto the apron or conveyer 47, which carries them toward the hook-chute. Bracket 39 extends under the apron in such a manner as to give a steady support to same. Directly over the apron is a blade or scraper 51, which lies so close thereto that it engages bodily with all the hooks and directs them to one side of the apron, the said blade being placed obliquely for that purpose. A blade or rail 52 is placed over the apron farther along in the direction of movement and is directed obliquely but reversely to the blade 51, so as to receive the hooks and carry them toward the other side of the apron. This rail is sufficiently raised above the apron to enable the sewing-eyes of the hook to slip under it and is adapted to enter between the tip and the body of the hook, and an inner flange 53 is provided that engages with these eyes. When the hooks pass from the first blade or scraper 51, they will all be lying with the hook up, but may occupy various angular positions. Then when the hook reaches the second blade or rail 52 the latter will engage the bend of its hook and the forward movement of the belt or apron 47 will cause the hook to turn one way or the other until its sewing-eyes enter beneath the rail, while its hook extends over the rail and strikes the flange 53, after which the hook will slide along on the flange and rail without turning, and the hooks will thus pass in regular order to the lower end of said blade, where they are delivered to the chute 48. The lower end of rail 52 extends in the direction of movement of the belt 47, so that when the hook reaches this point it will move forward between said rail and a fixed guard-plate 190 until its hook portion, which will always be presented at a certain angle and to one side, strikes a projecting rounded shoulder 191 on said guard-plate, and the forward movement of the belt will then pull the eye end forward and draw the hook into position of alinement with the chute or hook-race 48. Immediately thereafter the hook leaves the belt and passes by its momentum and gravity into and down the chute, its hook end lying at the rear with its tip pointed forward.

Figures 14, 15:
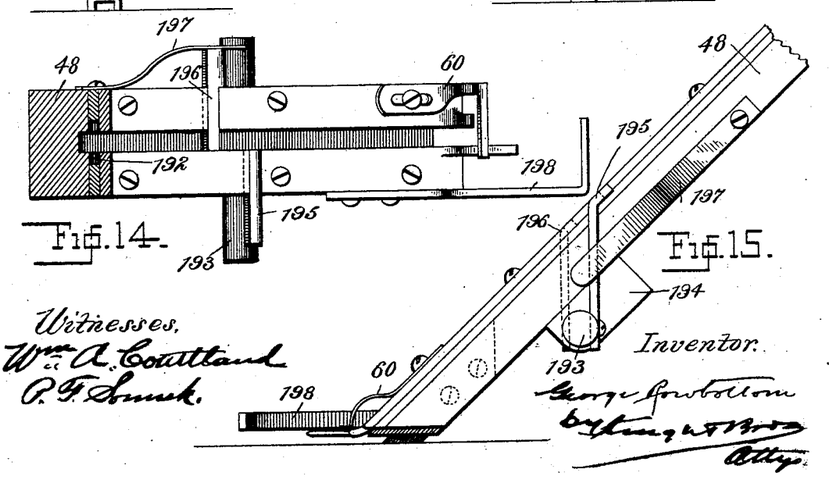
Figs. 14 and 15 are respectively top and side views of the lower end of the hook-chute.

The chute 48 is formed with side grooves 192, which receive the sewing-eyes of the hook and retain the hook in place in its descent. The motion of the hooks down the chute or race 48 is temporarily arrested by escapement means, so as to permit only one hook at a time to reach the lower end of the chute. Such escapement means (see Figs. 14 and 15) comprises a slide 193, guided in a block 194 on the under side of chute 48 and carrying arms or fingers 195 196, extending from opposite sides into the chute or race 48, so that as the slide 193 moves to and fro said fingers will alternately come into the chute in position to engage and stop the hooks therein. Said fingers are situated at a sufficient distance apart in the direction of motion of the hook to admit of one hook at a time entering between them. A spring 197 normally holds the slide to one side, and means are provided for operating the slide one stroke whenever a hook is to be fed, such means being associated with the gripper-actuating mechanism hereinafter described. In such to-and-fro stroke of the slide a single hook is allowed to pass from the accumulated row of hooks in the chute through such escapement device by the alternate withdrawal and engagement of the two fingers. The hook so released passes by gravity to the bottom of the chute and lies on the table 9 in line with the eye held at the bottom of the eye-chute and with its hook-tip pointing toward said eye and resting against a leaf-spring 60, which bears lightly upon it, but permits it to be carried forward at the proper time by the gripper mechanism. The next action of the machine is to carry the hook into engagement with the eye and then carry the engaged hook and eye to proper position on the card. In this action the eye is liable to be snapped up and out of position if it fits the hook too tightly. To prevent this, I provide an arm 198, projecting from the lower end of the hook-chute and extending in front of the eye-chute to prevent such upward movement of the eye, the latter being drawn under such arm.

Figure 3:
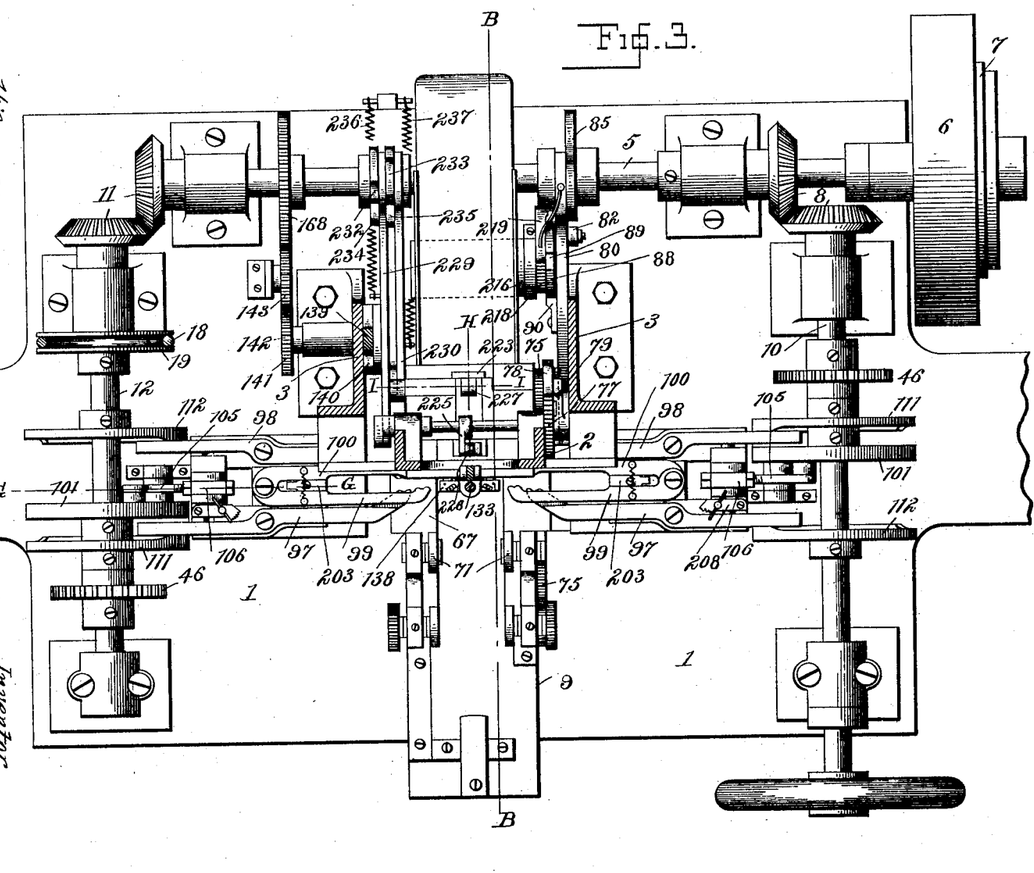
Fig. 3 is a horizontal section on the line A A in Fig. 2 with parts removed.
Figures 13, 16, 17:
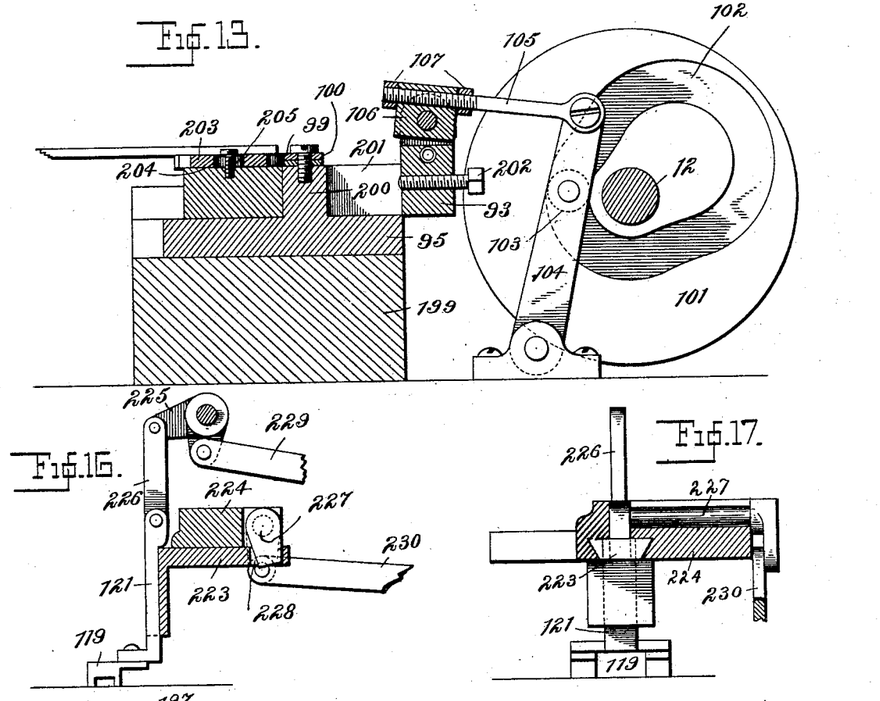
Fig. 13 is a vertical section on the line G G in Fig. 3, showing the gripper-actuating mechanism.
Figs. 16 and 17 are vertical sections on the lines H and I I in Fig. 3, showing the means for giving a four-motion action to the presser-foot for holding the hooks and eyes in position on the card.

The gripper mechanism (see Figs. 9 to 11 and Fig. 13) comprises a carrier or slide 93, carrying the grippers for the hooks, and a carrier or slide 95, carrying the grippers for the eyes, these slides being superimposed and sliding in suitable guideways in a block 199, fixed on the bed 1 in the direction of the line joining the lower ends of the hook and eye races. The hook-slide 93 is actuated to and fro positively by the operation of the machine; but the eye-slide 95 is operated in both directions by being drawn along by the hook-slide. To this end slide 95 has an upward projection 200, extending into a slot 201 in slide 93 and having a certain amount of free relative longitudinal movement therein, but adapted to be engaged by the ends of said slot, so as to be operated by the slide 93. A set-screw 202 on slide 93 limits the relative movement of slot 201, and thus determines the throw of the slide 95. Thus in each direction of movement of the hook-gripper slide it will have an initial movement independent of the eye-gripper slide and in its subsequent movement will carry the eye-gripper slide along with it. Hook-gripper levers 97 98 are pivoted to slide 93, and eye-gripper levers 99 100 are pivoted to the upward projection of slide 95. Hook-slide 93 is operated by a cam 101 on shaft 10 or 12, as the case may be, whose cam-groove 102 engages a pin or roller 103 on a lever 104, pivoted to the table 1 and connected by a link 105 with a swivel-block 106, pivoted to the slide 93, screw-adjusting devices for this being provided at 107. Gripper-levers 97 98 are acted on by a compression-spring 109, which tends to press their gripper ends or jaws 157 together, and side cams 111 112 act on the gripper-levers in opposition to this spring to press the jaws apart. The eye-gripper levers 99 100 are acted on by a tension-spring 110, bringing their jaws together, and a cam-block 203, fastened on the hook-slide 93 by an adjustable screw-and-slot connection 204 205, has shoulders or cam-faces 206, engaging inclines or shoulders 207 on the gripper-levers 99 100 to press the levers apart. This action takes place as soon as the hook-slide begins to move back from its more advanced position, (shown in Fig. 3,) and during the remainder of the back movement of the hook-slide the block 203 rides between the fingers or gripper-levers 99 100 until the end of the slot 201 in the hook-slide strikes the projection or stud 200 of the eye-slide, when all the parts move back together. Then when the hook-slide begins to advance from its most retracted position (shown in Fig. 13) it will move independently of the eye-slide until the screw 202 at end of slot 201 strikes stud 200 and carries the eye-slide along. Just before the eye-slide begins to move in this manner the shoulders 206 of block 203 on the hook-slide pass the inclines 207 on the eye-fingers and allow the latter to move inward to grasp the eye. The escapement mechanisms for the hook and eye races are operated by a cam-bar 208, attached to the hook-slide 93 and carrying two cam faces or inclines 209 210, respectively adapted to engage the slide 193 of the hook-escapement and the slide 180 of the eye-escapement. Bar 208 is pivoted to slide 93 at 211 and is normally held in engaging relation by a screw-clamp 212. By loosening this clamp the bar is freed, so that it will yield when striking slides 193 180, and is therefore rendered inoperative, the springs 197 184 for the slides then holding the slides to one side. This enables the hook and eye feed to be stopped instantaneously at any time.

Figure 4:
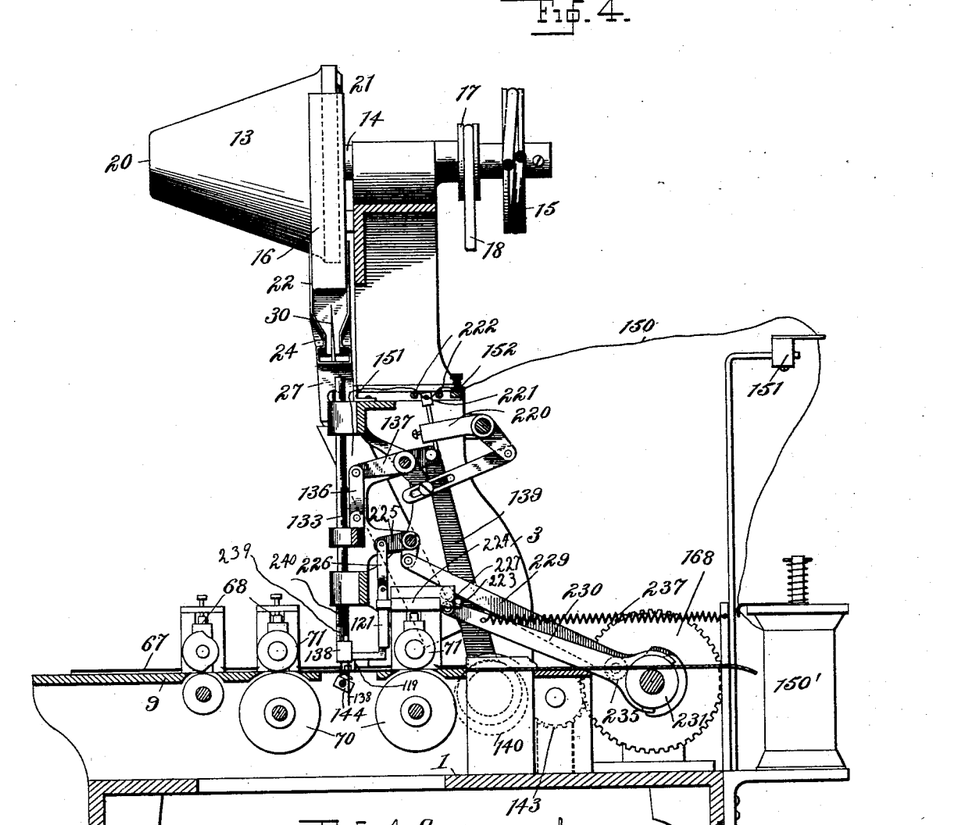
Fig. 4 is a vertical section on the line B B in Fig. 3, the hook-feeding devices being omitted.
Figure 5:
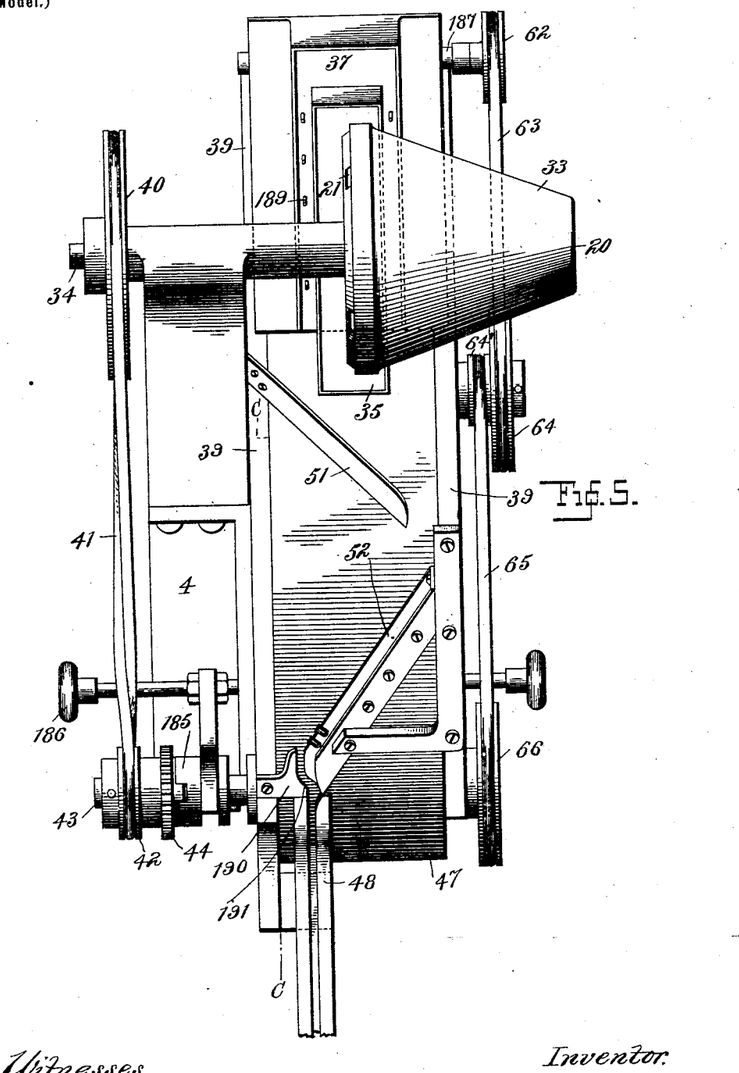
Fig. 5 is a plan view of the hook-receptacle and the devices for receiving and feeding the hooks therefrom.

The card-feeding mechanism (see Figs. 3, 4, and 18) comprises a track or way for receiving the cards defined by guides 67 on the table 9 and feed-rolls 70 71, arranged in two series, respectively below and above said track and engaging frictionally with the cards. The upper feed-rolls are provided with adjustable spring-tension devices 68. The lower rolls 70 are connected by gears 75 with a shaft 76, carrying a ratchet-wheel 77, which is engaged by a pawl 78 on an arm or lever 79, to which is pivoted one end of a bar 80, whose other end is forked and slides over a hub 81 on the shaft 5. A cam 85 on this shaft 5 engages a roll 82 on the bar 80, and a spring 86 is arranged to press this roll toward the cam, said spring being connected at one end to the standard 3 and at the other end to a link 83, pivoted to a bell-crank 66, which is also pivoted on standard 3 and engages a pin 84 on the bar 80. Cam 85 has two projecting portions, which cause the bar 80 to reciprocate twice in each rotation of shaft 5, and there are consequently two feeding movements of the feed-rolls for each such rotation, for each such rotation results in the delivery of a single pair of hooks and eyes on each side of the card, and as each eye and hook has two sewing-eyes there must be twice as many stitches and twice as many feeding movements as there are pairs of hooks and eyes in each row. At intervals, owing to the filling of one card and the passage to the next, it is desirable to make an extra feed without stitching, and to this end I provide a stop-disk 88 on a stud-shaft 215, fixed on a frame-block 216 and carrying also a ratchet-wheel 218, engaged by a pawl 219 on the reciprocating feed-bar 80, so that said stop-disk is turned in accordance with the feed of the cards. This stop-disk is provided with notches 89 therein adapted to receive a lug 90 on the bar 80. Said lug normally rests against the periphery of said stop-disk, and thereby limits the back stroke of the bar 80, so that only a limited feed is effected sufficient to carry the card the distance from one sewing-eye to the next; but in each semi-revolution of disk 88, corresponding to the length of a card, a notch 89 permits a greater back movement of the feed-bar 80, and the next action of the cam 85 will cause a correspondingly greater forward stroke and give an extra feed.

Figures 18, 20:
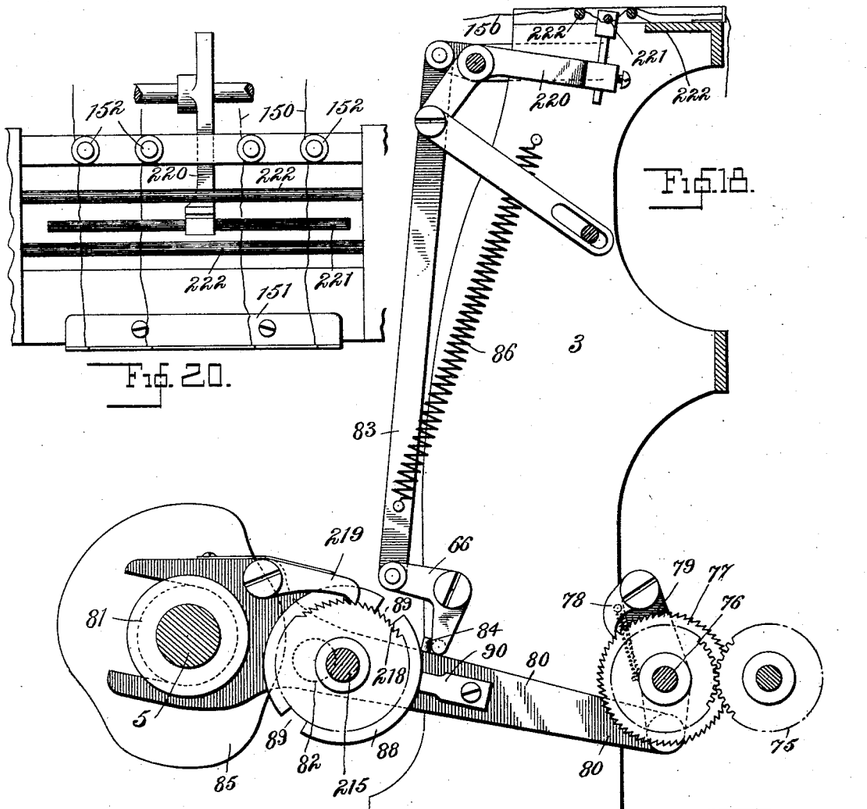
Fig. 18 is a side elevation of the feed mechanism and take-up mechanism for the thread, showing same in the normal position.
Fig. 20 is a top view of the take-up device.
Figure 19:
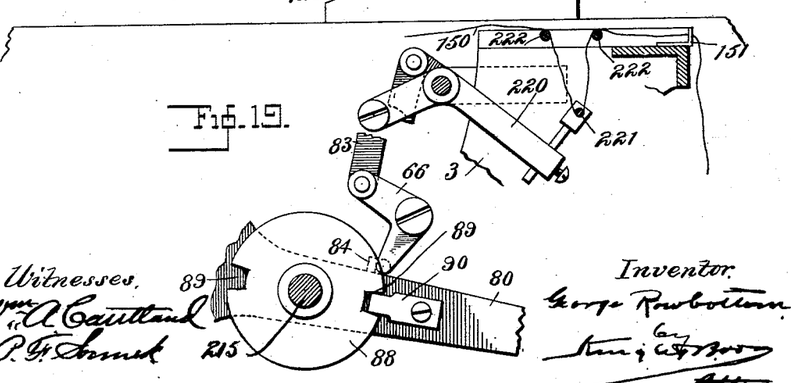
Fig. 19 is a similar view of the take-up, showing the position assumed in the extra take-up necessitated by the passage from card to card.

A take-up-regulating device is also controlled by the disk 88. The link 83 is connected at its upper end to a lever 220, pivoted to a fixed support and carrying a take-up bar 221, extending over the threads 150, which pass over fixed bars 222. As the link 83 rises before each feed it pulls bar 221 down and gives a take-up action during the rise of the needle-bar and also draws thread from the spool for the next stitch. At the end of each card, however, an extra quantity of thread is required on account of the extra feed, and at such time one of the notches 89 in disk 88 will allow an extra movement of bar 80, bell-crank, and link 83 to give the extra pull on the thread.

When the engaged hooks and eyes are deposited by the gripper mechanism on the card, they must be held in place during the sewing operation, it being understood that the grippers must immediately be withdrawn from them to enable the sewing to be effected. For this purpose a presser-foot 119 is provided on each side of the machine, adapted to engage with a hook and eye and firmly hold same without interfering with the sewing. The presser-foot must be brought down on each hook and eye pin, hold it during the first stitch through the sewing-eyes on one side, then feed forward with it to bring the other sewing-eyes into position and hold it during the sewing of the latter eyes, and then rise and remain up until the hook and eye is fed forward and another pair is deposited in place. This operation requires a four-motion feed, which is effected by the means shown in Figs. 4, 16, and 17. The presser-feet 119 are carried by a presser-bar 121, which slides in a vertical slot or guide in a cross-slide 223, which in turn slides in a horizontal slot or guide in a bracket 224, projecting from the table 1. One arm of a bell-crank 225, pivoted to bracket 2, is connected by a link 226 to the presser-bar 121, and another two-armed lever 227 has one arm engaging in a slot 228 in slide 223. The other arms of bell-crank 225 and lever 227 are connected to bars 229 230, whose other ends are forked and slide over hubs 231 on the shaft 5. Cams 232 233 on this shaft engage with rolls 234 235 on said bars 229 230, and springs 236 237 pull the bars so as to cause the rolls to engage said cams. In each rotation of shaft 5 the bars 229 230 are reciprocated alternately and successively to work the bell-crank 225 and lever 227 in sequence, so as to cause the presser-bar 121 to move down and remain down temporarily, then cause the slide 223, with the presser-bar and foot, to move forward as the card and hook and eye is fed forward, then to lift the presser-bar 121, and finally move the slide 223, with the presser-bar 121, backward.

Figures 6, 7, 8, 21, 22:
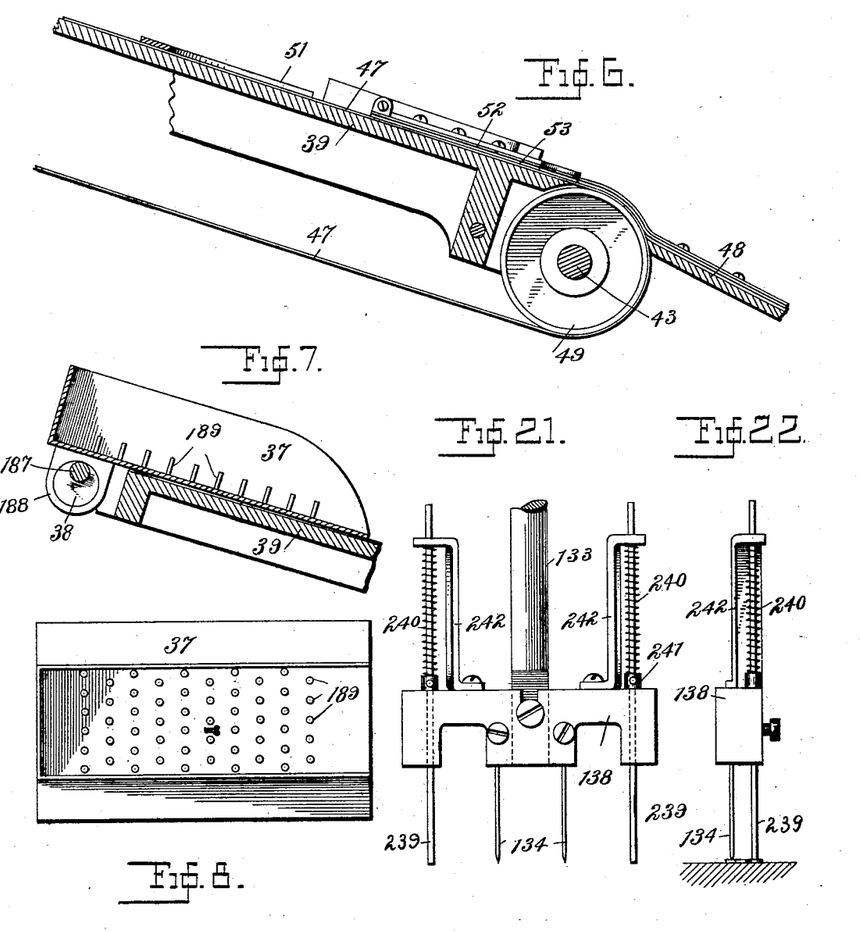
Fig. 6 is a vertical section on the line C C in Fig. 5.
Fig. 7 is a vertical section of the hook-receiving tray and its supporting devices.
Fig. 8 is a plan view of said tray.
Figs. 21 and 22 are respectively front and side views of the needle-bar and attached devices.
Figure 9:
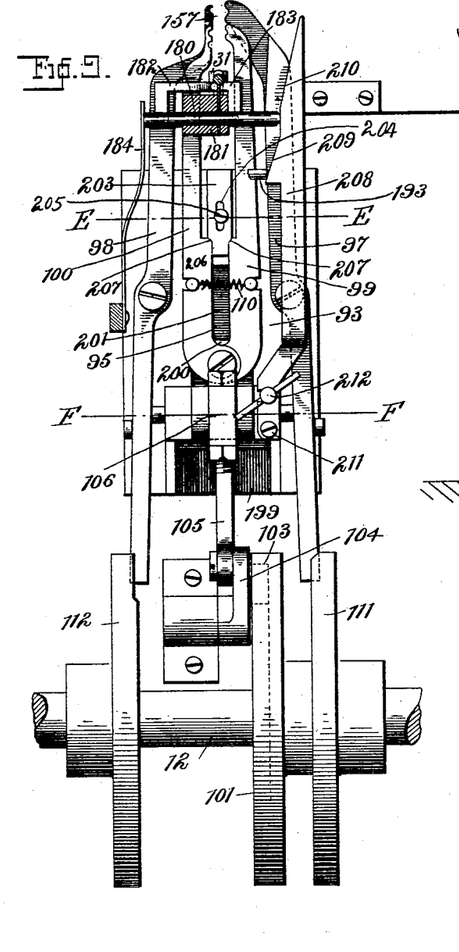
Fig. 9 is a plan view of the gripper mechanism for transferring the hooks and eyes from their delivery-chutes to proper position on the card, the hook-chute being omitted.
Figure 10:
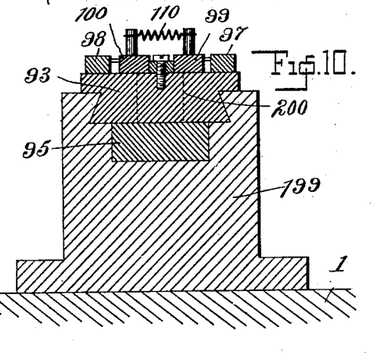
Figs. 10 and 11 are sections on lines E E and F F in Fig. 9.
Figure 11:
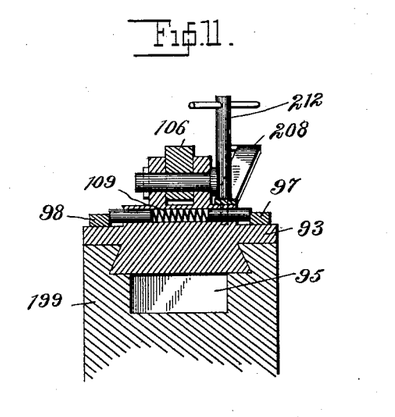

The needle-bar 133 is mounted to slide vertically on bracket 2 and carries four needles 134. A shaft 141, journaled in the bed 1, is connected by gears 142 143 168 to shaft 5 in such manner as to rotate twice for each rotation of shaft 5. This shaft 141 carries an eccentric 140, operating a link 139, connected by rocking lever 137 and link 136 to the needle-bar, so that in each rotation of shaft 5 the needle-bar is given two reciprocating vertical movements. The cross-arm 138 of the needle-bar which carries the needles 134 also carries two pilot-pins 239, sliding in vertical holes in said arm, and springs 240 are provided, engaging with collars 241 on said pins and with brackets 242, fixed on arm 138, so as to press said pins downwardly and hold the collars 241 against the arm 138. As the needle-bar descends to sew the first of two pairs of hooks and eyes these pilot-pins will enter the second sewing-eyes of the eyes which are being sewed on and hold the said eyes firmly in position while the first stitch is effected. This is desirable to prevent any lateral or angular displacement of the eyes by the drawing up of the thread through the sewing-eyes of same. By using these pilot-pins I am able to make the presser-foot in the form of a single bridge or flat block bearing only on the top of the hook and not confined to the shape of the hook and eye, therefore avoiding any liability of the presser-foot to jam or crush the hook in case the latter is somewhat abnormal in shape.

The thread-spools are shown at 150' and the thread-guiding and tension devices at 151 152. Below or within the table 9 are arranged four loopers 144, formed as hooks on a rockshaft 145, actuated by cam 171 on the shaft 141, which operates a lever 170, pressed by spring 174 against said cam and connected by a link 147 with a crank 146 on the rockshaft 145, the hooks 144 being thereby oscillated in such manner as to catch and loop the thread at each stroke of the needle-bar, hold the loop, and draw the next loop through it in well-known manner to form a chain-stitch.

The operation of the machine is as follows: Hook-receptacles 33 and eye-receptacles 13 are charged with hooks and eyes in bulk, cards are placed on the table 9 and into the grip of the feed-rolls 70 71 as fast as required, and the thread from spools 150 is led in usual manner through the tension, take-up, and needle devices. Power being applied to main shaft 5, the eye and hook receptacles are caused to slowly rotate, dropping eyes and hooks a few at a time into the respective casings 16 and 35, the eyes then passing to the chute 22 and the hooks to the tray 37. As the eyes pass down chute 22 some of them will pass onto rail 25 and will become engaged on bead 30 and will then pass down said bead and collect above the escapement mechanism. All eyes which pass the rail 25 will be discharged through wasteway 27. As the hooks pass down tray 37 they will be "righted" or put on their backs by the vibration or agitation of the tray, aided by the action of the pins therein, and will pass onto the apron 47, which will carry them forward, the blade 51 first scraping or sweeping them to one side and the blade or rail 52 then catching them and stringing them in regular alined order and delivering them to the guard 59, which turns them so as to lie with hook end rearward. They then enter and descend the hookchute 48 and collect above the escapement therein. At each stroke of the gripper mechanism the cam-bar 208, attached thereto, causes both the hook and the eye escapements to act at once, dropping a single hook and a single eye, the eye being held by the leaf-spring 31 at the lower end of the chute, so as to allow the loop of the eye to hang below the bottom of the chute in an inclined position, while the hook is stopped by the leaf-spring 60, so as to rest on the table 9 with its hook-tip back of and pointing toward the eye. As the gripper mechanism returns the hook and eye gripper jaws are brought back, so as to respectively embrace the hook and eye just fed to the lower ends of the chutes, without, however, touching said hook and eye. On the next stroke of the gripper mechanism the hook-gripper jaws are first closed by the action of cams 111 112 to clasp the hook. Then the cam 101 causes the hook-grippers to advance, carrying the hook with them and drawing it out from the leaf-spring 60 and into engagement with the eye. In this movement of the hook-gripper the inclines or shoulders 206 on the block 203 pass the shoulders 207 on the eye-gripper levers and allow the gripper-jaws 99 100 to clasp the eye, and in the continued forward movement of the hookgripper slide its screw 202 strikes the stud 200 on the eye-slide along with it, drawing it from the leaf-spring 31 and bringing both hook and eye in engaged relation in proper position over the card. At this moment the presser-bar 121 descends and the presser-foot 119 engages the top of the hook to hold the hook and eye, the gripper-jaws then opening out and retreating. The needle-bar 133 now descends, bringing the pilot-pins 239 in the second sewing-eyes of the eye of each pair and passing a loop of thread through the first sewing-eyes of each eye, such loop being caught by the looper-hooks 144. As the needle-bar ascends the springs 240 hold the pilot-pins in engagement with the eyes for a sufficient time to prevent displacement thereof by the drawing up of the thread. The cam 85 now comes into action to turn the ratchet-wheel 77 and feed-rolls 70, so as to feed the card the distance from one sewingeye to the next. The presser-foot partakes of this feeding motion, as above explained. The needle-bar then descends again, the pilot-pins being without function in this stroke, which serves to stitch the second sewing-eyes. The presser-foot 119 then rises and the card is fed another stroke by cam 85 and the operation, as above described, is repeated. The take-up and the special operations that take place at the end of card have already been described.

Having thus described my invention, the following is what I claim as new therein and desire to secure by Letters Patent:

1. A machine for fastening hooks on cards comprising a hook-receptacle, an inclined tray having a flat surface onto which the hooks are dropped, and spaced and quincuncially-arranged projections on the surface between which the hooks are caused to meander, and means for imparting an undulating vibratory movement to the tray whereby the hooks are jumped and laid on their backs with their eyes and tips directed toward the discharge end of the tray.

2. A machine for fastening hooks on cards comprising a hook-receptacle, an inclined tray having a flat surface provided with pins, sliding bearings for the lower end of the tray, and an eccentric supporting the upper end of the tray whereby an undulating vibratory movement is imparted to the tray.

3. A machine for fastening hooks on cards comprising an inclined apron on which the hooks are deposited, a blade extending obliquely across the apron, in the path of the hooks for directing the hooks to one side of the apron, a reversely-arranged blade extending obliquely across, and slightly elevated from the apron, in the path of the hooks carried by the apron, from the first-named blade for receiving the hooks which are supported by their tips thereon, and advanced along the last-named blade by the apron to the other side of the latter, and a hook-chute for receiving the hooks from the apron.

4. A machine for fastening hooks on cards comprising a hook-receptacle, an inclined tray having a flat surface onto which the hooks are dropped, a bracket on which the tray is mounted, an inclined apron traveling beneath the lower end of the tray for conveying the hooks from the tray, a blade extending obliquely across the apron in the path of the hooks for directing the hooks to one side of the apron, a reversely-arranged blade extending obliquely across, and slightly elevated from the apron, in the path of the hooks carried by the apron, from the first-named blade, for receiving the hooks which are supported by their tips and advanced thereon along the last-named blade by the apron to the other side of the latter, and a hook-chute, for receiving the hooks from the apron.

5. In a machine for fastening hooks on cards, the combination with the hook-chute, of the escapement-slide-carrying fingers controlling the passage of hooks in said chute, a reciprocating gripper-slide carrying grippers adapted to take the hook from said chute, and a cam device carried by said gripper-slide and adapted to engage and operate the escapement-slide, said cam device being pivotally mounted on the gripper-slide and provided with clamping means to clamp it in operative position.

6. The combination with the hook-and-eye races, and escapement devices therein, of gripper devices adapted to take the hooks and eyes from the respective races, a reciprocatory slide actuating said gripper devices, and cam parts carried by said slide and actuating both of said escapement devices.

7. The combination with the eye-race and escapement device therefor, of a reciprocatory slide, a cam part carried thereby and pivoted thereto, a clamp to hold the cam part in operative position on the slide, and a spring actuating the escapement device in opposition to the action of said cam part.

8. The combination with the hook-and-eye feeding means, of gripper devices for engaging the hooks, gripper devices for engaging the eyes, slides carrying the respective gripper devices, mechanism for positively operating the hook-gripper slide and means connecting the said slides so as to cause the hook-gripper slide to have an initial movement independent of the eye-gripper slide, and in its subsequent movement to carry the eye-gripper slide along with it.

9. The combination with the hook-and-eye feeding means of the hook-grippers, eye-grippers, and two slides carrying the respective grippers, having a connection allowing a limited amount of free relative movement, so that the hook-gripper slide first moves independently of the eye-gripper slide, and then carries the latter slide with it, and means for positively operating the hook-gripper slide.

10. The combination with the hook-and-eye feeding means of the hook-grippers, eye-grippers, and two slides carrying the respective grippers having a connection allowing a limited amount of free relative movement, so that the hook-gripper slide first moves independently of the eye-gripper slide, and then carries the latter slide with it, and means for positively operating the hook-gripper slide, such means comprising a cam operatively connected to said slide.

11. The combination with the hook-and-eye feeding means, of hook-grippers and eye-grippers, slides carrying the respective grippers, having a limited free relative movement, springs tending to move the grippers to gripping position, means for positively operating the hook-gripper slide, means for positively operating the eye-gripper slide, and means carried by the hook-gripper slide and engaging the eye-grippers to open same during the movement of the hook-gripper slide relatively to the eye-gripper slide.

GEORGE ROWBOTTOM.

Witnesses:
WM. A. COURTLAND,
J. M. GALLOND.

Correction in Letters Patent No. 710,517.

It is hereby certified that in Letters Patent No. 710,517, granted October 7, 1902, upon the application of George Rowbottom, of Waterbury, Connecticut, for an improvement in "Machines for Sewing Hooks and Eyes on Cards," an error appears in the printed specification requiring correction, as follows: In line 51, page 6, the word "at" should be stricken out; and that the said Letters Patent should be read with this correction therein that the same may conform to the record of the case in the Patent Office.

Signed and sealed this 21st day of October, A. D., 1902.

[SEAL.]

F. I. ALLEN,
*Commissioner of Patents.*